July 31, 1962 — W. T. HAWKES — 3,047,651
CABLE SPLICE
Filed Feb. 20, 1961
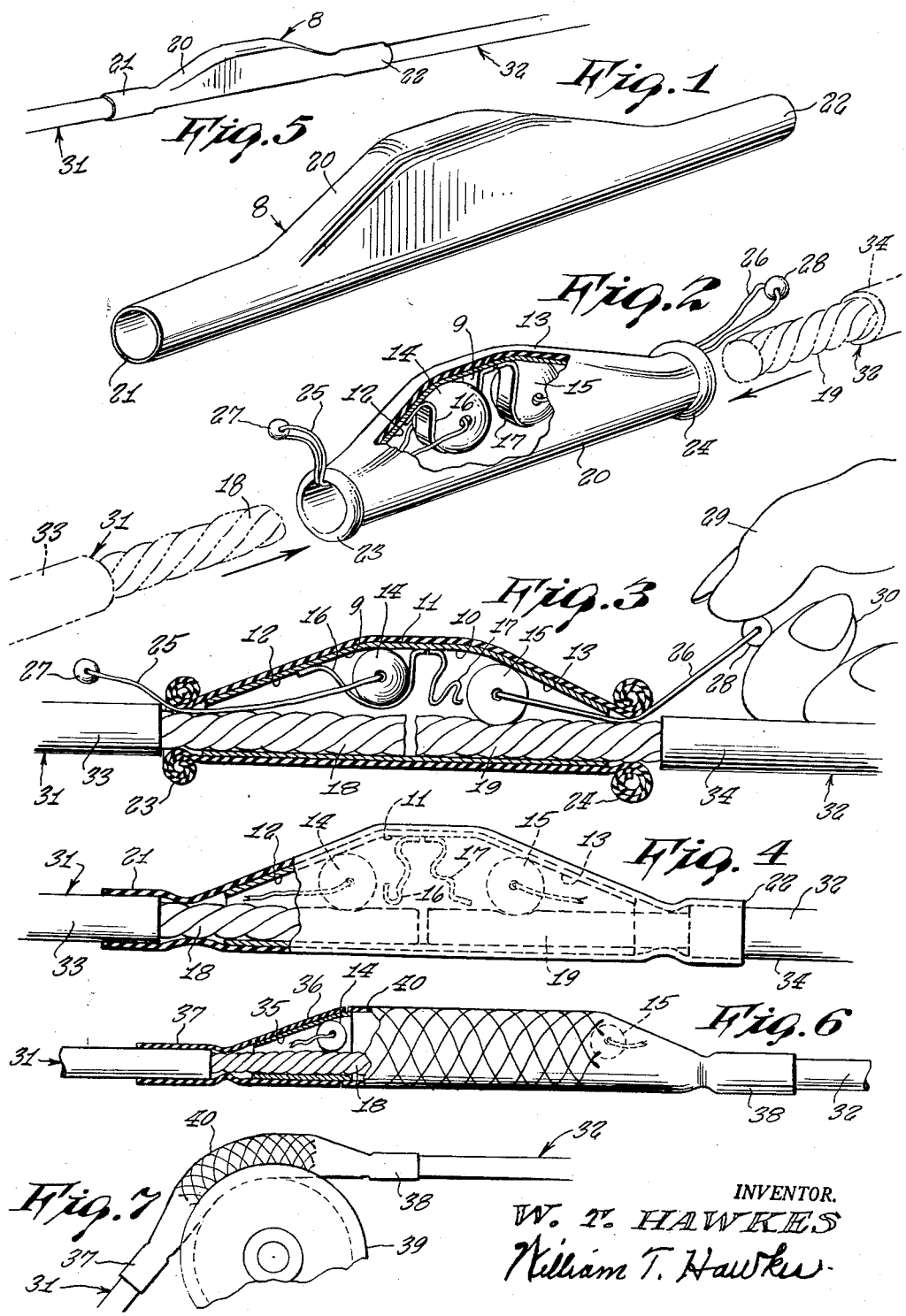
INVENTOR.
W. T. HAWKES
William T. Hawkes

United States Patent Office 3,047,651
Patented July 31, 1962

3,047,651
CABLE SPLICE
William T. Hawkes, Box 485, Montgomery, W. Va.
Filed Feb. 20, 1961, Ser. No. 90,555
6 Claims. (Cl. 174—84)

The present invention relates to means for connecting and uniting cables and the like, and particularly to a cable splice.

The main object of my invention is to provide convenient and effective means for directly connecting two cables both physically and electrically without soldering or brazing or using heat.

Another more specific object of my invention is to provide a special splice for cables in the form of an elongated sleeve into the ends of which the ends of the cables to be connected are inserted and secured in situ.

A further object of the invention is to have such a sleeve with round ends but an intermediate portion which tapers toward both ends of this sleeve.

It is a further object to include means for frictionally engaging and binding the ends of the cables within the tapered portions of the splicing sleeve.

It is likewise an object to include means for manually causing the inserted cable ends to be locked within the splicing sleeve when these cable ends extend the intended distance into the sleeve.

It is even an object of this invention to have the splicing sleeve made of conductive metal externally insulated and at the ends having flexible insulation which may be temporarily rolled back from the cable ends while being inserted into the sleeve and thereafter again rolled outwardly over said cable ends to cover the same.

It is, of course a practical object of this invention to have a sturdy splice structure which is easily applied and rugged for use, and yet reasonable in cost in order to encourage wide distribution on the market.

Other objects and advantages will appear in greater detail as the specification proceeds.

In order to facilitate clear comprehension of this invention for a proper appreciation of the salient features thereof, the invention is illustrated on the accompanying drawing forming part hereof, and in which:

FIGURE 1 is a perspective view of a cable splice or splicing sleeve made according to my invention and embodying the same in a practical form;

FIGURE 2 is a similar view showing the ends rolled back and the intermediate portion partly in section to reveal interior detail, and also showing cable ends ready to be inserted into the sleeve;

FIGURE 3 is a side view which is virtually a longitudinal, vertical section of the sleeve of FIGURE 2 showing the cable ends inserted into position in the sleeve and a friction locking member being manually pulled into effective locking and retaining position within one end of the sleeve;

FIGURE 4 is a side view of the finished cable splice, partly in section and showing the cable ends effectively locked in position by wedging members and the rubber sleeve ends rolled out over the cable insulation at both ends of the ensemble;

FIGURE 5 is a side elevation of the new splice showing the invention incorporated in a cable;

FIGURE 6 shows a modification wherein the rigid inclined or tapered portions are located at the ends only of the sleeve and the intermediate portion is made of flexible braided material to allow the cable with the splice to travel over a pulley, if desired; and FIGURE 7 shows the cable and its splice of FIGURE 6 passing over a pulley while remaining intact.

Throughout the views, the same reference numerals indicate the same or like parts and features.

In many situations in industry large electrical cables are used to carry heavy power current, but this presents problems when such cable require to be spliced, as any splice will necessarily have to withstand the heavy currents carried by the cables involved. Upon considering this problem, it has occurred to me that a special splicing sleeve should be available into which the ends of cables should be inserted and retained by wedging balls, or the like, and the whole insulated. As a result, I have succeeded in producing a cable splice as already outlined, which I will now describe in the following.

Hence, in the practice of my invention, and referring now again to the drawing, a splicing sleeve, generally indicated at 8, primarily includes an internal metal sleeve member 9 which is round at both ends while being vertically widened intermediate the ends at 10 with the roof 11 tapering down at 12 and 13 toward both ends, as best seen in FIGURES 2, 3 and 4. Within inner sleeve 9 are located two metal balls or rollers 14, 15, initially held in place beneath roof 11 by means of adhesive tapes 16, 17 out of contact with cable ends 18, 19 when the latter are first inserted into the ends of the sleeve as especially shown in the left side of FIGURE 3 and thus allowing the cable ends to be freely introduced until they meet inside the sleeve. This sleeve is provided with an external insulating sleeve 20 which follows the contour of inner sleeve 9, with elongated round hollow ends 21, 22, as best seen in FIGURES 1, 4 and 5.

The mentioned sleeve ends 21 and 22 are flexible and when a pair of cable ends 18 and 19 are to be inserted in order to be spliced these flexible ends are first rolled up as shown in FIGURES 2 and 3 close to the ends of inner sleeve 9, at 23 and 24 in order to leave a clear field for operation. The metal balls or rollers 14 and 15 have individual pull cords or wires 25, 26 connected thereto and brought out from the ends of sleeve 9 and externally terminating in hand grip balls 27, 28 by which the fingers 29, 30 may grip them at each end of the device to pull these balls outward toward the ends of the sleeve in order to cause them to wedge between the inclined roof portions 12 and 13 and the naked cable ends 18 and 19 as shown initially wedged as shown at 15 and 19 in FIGURE 3 and shown in broken lines in FIGURE 4, for example.

It is obvious that when the cables 31, 32, which have insulation 33, 34 are to be joined, part of the insulation at the ends must first be removed to expose ends 18 and 19 already mentioned, but when these cable ends are properly wedged as indicated in FIGURE 4, the insulation rolls 23 and 24 are rolled out to overlap and cover the ends of the insulation 33, 34 as shown in FIGURES 4 and 5, the pull cords or wires 25, 26 being easily cut off as having served their purpose. It is thus evident that the balls or rolls 14 and 15, when wedged between the cable ends 18 and 19 and the inclined or tapered roof portions 12 and 13 prevent outward removal of the cable ends from within inner metal sleeve 9 and form fixed contact means between the inner sleeve and the cable ends and in this manner these cables are interconnected by said sleeve. It is also evident that the stronger the pull exerted upon the cables just mentioned, the more firmly the balls are wedged between the cables and inner sleeve, while the whole ensemble is adequately insulated by the outer sleeve 20 with its extending ends 21 and 22.

In FIGURES 6 and 7 is shown a flexible form of splice wherein the cable ends of cables 31 and 32 are wedged by balls 14 and 15 within the tapered inner sleeve members 35 (one shown), while the latter are externally connected by a flexible sheath of woven metal or other fabric 40, allowing the ensemble to ride over a pulley 39 if desired. The end insulation sheaths 36, 37 and 38 cover the inner sleeves and the ends of the cable insulation on both cables 31 and 32.

It is now clear that two cables for heavy current loads may quickly and firmly be connected in fully conductive manner with sufficient insulation to enclose the connections made in practical manner.

Manifestly, variations may be resorted to, and parts and features may be modified or used without others within the scope of the appended claims.

Having now fully described my invention, I claim:

1. A cable splice including a rigid metal sleeve with open ends for receiving bare ends of two metal cables to be interconnected, and means within the sleeve capable of being wedged between each bare cable end and the internal wall of said sleeve, the intermediate portion of said sleeve being higher than the end portions and formed with inclined wall portions tapering symetrically from the intermediate portions of said sleeve toward the ends thereof, said means to be wedged including a pair of metal members located within said sleeve and having individual pull cords attached thereto and extending out through the ends of the sleeve to exterior accessible positions.

2. A cable splice according to claim 1, wherein the metal members are metal balls.

3. A cable splice according to claim 1, wherein the metal members are metal rollers.

4. A cable splice according to claim 1, wherein the metal members are initially suspended from the internal inclined wall portions and held out of the path of bare cable ends inserted into the sleeve.

5. A cable splice according to claim 4, including adhesive tape means initially releasably suspending the metal members up above the bare cable ends when introduced into said sleeve.

6. A cable splice according to claim 1, including an insulating sleeve enveloping the metal sleeve and extending a short distance beyond each end thereof.

References Cited in the file of this patent

UNITED STATES PATENTS

| | | |
|---|---|---|
| 1,271,912 | Kemper | July 9, 1918 |
| 1,997,649 | Ohlund | Apr. 16, 1935 |